United States Patent
Stoyanov et al.

(10) Patent No.: US 10,851,765 B2
(45) Date of Patent: Dec. 1, 2020

(54) BELL HOUSING FOR A WIND TURBINE GEAR MECHANISM

(71) Applicant: ZF FRIEDRICHSHAFEN AG, Friedrichshafen (DE)

(72) Inventors: Deyan Stoyanov, Bochum (DE); Steffen Fischer, Nordkirchen-Suedkirchen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 33 days.

(21) Appl. No.: 16/315,181

(22) PCT Filed: Jun. 26, 2017

(86) PCT No.: PCT/EP2017/065670
§ 371 (c)(1),
(2) Date: Jan. 4, 2019

(87) PCT Pub. No.: WO2018/007184
PCT Pub. Date: Jan. 11, 2018

(65) Prior Publication Data
US 2019/0234382 A1 Aug. 1, 2019

(30) Foreign Application Priority Data
Jul. 7, 2016 (DE) .................. 10 2016 212 375

(51) Int. Cl.
*F16H 1/28* (2006.01)
*F03D 80/80* (2016.01)
*F03D 15/00* (2016.01)
*F16H 57/025* (2012.01)
*F16H 57/02* (2012.01)

(52) U.S. Cl.
CPC ............. *F03D 80/88* (2016.05); *F03D 15/00* (2016.05); *F16H 1/28* (2013.01); *F16H 57/025* (2013.01); *F05B 2260/40311* (2013.01); *F16H 2057/02078* (2013.01); *Y02E 10/726* (2013.01)

(58) Field of Classification Search
CPC ........... F03D 80/88; F16H 2057/02091; F16H 57/025
See application file for complete search history.

(56) References Cited

U.S. PATENT DOCUMENTS

| | | | | |
|---|---|---|---|---|
| 7,444,901 | B2 * | 11/2008 | Okuno | .................. F16H 57/027 74/606 R |
| 9,841,067 | B1 * | 12/2017 | Logan | ..................... F16D 13/64 |
| 2012/0244989 | A1 | 9/2012 | Winkelmann | |
| 2016/0263941 | A1 * | 9/2016 | Jensen | .................. F16H 57/037 |

FOREIGN PATENT DOCUMENTS

DE 102010043946 A1 7/2011

OTHER PUBLICATIONS

Anonymous: "Adwen Adwen begins testing of the AD 8-180 drivetrain at Fraunhofer IWES test bench in Bremerhaven—Adwen", Jun. 6, 2016 (Jun. 6, 2016), XP055406630, the whole document.

* cited by examiner

*Primary Examiner* — Derek D Knight
(74) *Attorney, Agent, or Firm* — Leydig, Voit & Mayer, Ltd.

(57) ABSTRACT

A bell housing includes a first region configured to be secured in a nacelle of a wind turbine, a second region configured to receive a gear mechanism, and a wall connecting the first region and the second region together. The wall is provided with at least two recesses.

11 Claims, 3 Drawing Sheets

BELL HOUSING FOR A WIND TURBINE GEAR MECHANISM

CROSS REFERENCE TO RELATED APPLICATIONS

This application is a U.S. National Stage Application under 35 U.S.C. § 371 of International Application No. PCT/EP2017/065670 filed on Jun. 26, 2017, and claims benefit to German Patent Application No. DE 10 2016 212 375.0 filed on Jul. 7, 2016. The International Application was published in German on Jan. 11, 2018, as WO 2018/007184 A1 under PCT Article 21(2).

FIELD

The invention relates to a bell housing for a wind turbine gear mechanism.

BACKGROUND

Torque supports and bell housings are known from the prior art for securing a gear mechanism in the nacelle of a wind turbine. Bell housings are generally provided with ribs in order to increase stiffness.

SUMMARY

In an embodiment, the present invention provides a bell housing. The bell housing includes a first region configured to be secured in a nacelle of a wind turbine, a second region configured to receive a gear mechanism, and a wall connecting the first region and the second region together. The wall is provided with at least two recesses.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1A:
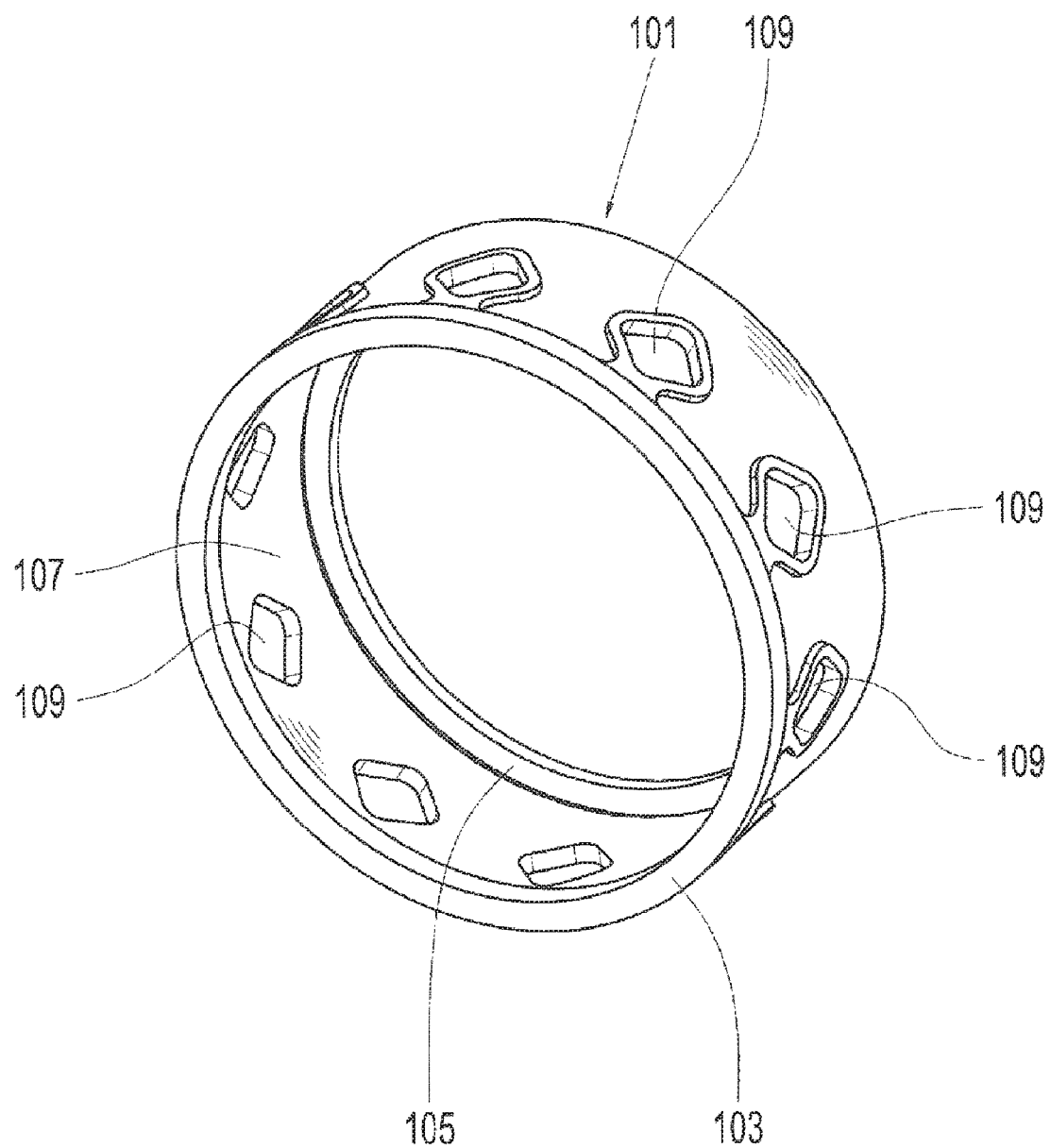
FIGS. 1a and 1b illustrate a bell housing.

The ribs provided for bell housings can, however, cause problems during casting. Embodiments of the invention aim to provide a bell housing which does not have the disadvantages inherent in the solutions known from the prior art. In particular, embodiments of the invention provide bell housings that can be easily cast without sacrificing stiffness. In addition, embodiments of the invention provide bell housings with improved oscillation behavior.

A bell housing according to an embodiment of the invention has a first region, a second region, and a wall. The first region is designed to secure the bell housing in a nacelle of a wind turbine. The second region is used to receive a gear mechanism, i.e., to secure a gear mechanism in the bell housing. The bell housing thus forms an intermediate piece between the gear mechanism and the nacelle, which intermediate piece secures the gear mechanism in the nacelle.

The first region and/or the second region are preferably configured as a flange. A flange has the basic shape of a toroid and is provided with bores. These bores serve to screw the flange to a counterpart—usually, a further flange.

The wall connects the first region and the second region together. This determines a fixed position of the first region and the second region relative to one another.

The wall preferably extends between the two regions along annular cross-sectional areas. A first annular sectional area delimits the first region from the wall. Accordingly, a second annular sectional area delimits the second region from the wall.

According to the invention, the wall is provided with at least two recesses. The recesses are, for example, designed as depressions or indentations, or as holes. The recesses have a favorable influence on the ratio between mass and stiffness of the bell housing.

In a preferred development, the bell housing has a rotationally symmetrical basic shape. In particular, the basic shape can be rotationally symmetrical with respect to a rotation axis. Primarily, the first region, the second region, and the wall are each rotationally symmetrical.

The basic shape of a body denotes the shape of an original body from which the first-mentioned body is formed by eliminating individual regions, e.g., by inserting recesses. The rotationally symmetrical bell housing is thus formed from a rotationally symmetrical original body, into which the aforementioned recesses, inter alia, are introduced.

In a further preferred development, the recesses are arranged such that at least one cross-sectional plane intersects all recesses. A cross-sectional plane is a plane which is aligned orthogonally to the aforementioned axis of symmetry axis and/or axis of rotation.

Furthermore, two each of the recesses can, preferably, be mapped onto each other by rotation. The rotation may, in particular, take place around the aforementioned axis of symmetry axis and/or axis of rotation. Mappability onto one another by rotation means that the recesses are offset from one another in the circumferential direction. Moreover, mappability onto one another implies that the recesses have the same shape.

Radial alignment of the recess is preferred. Each recess has at least one orifice. A radial alignment of the recess is equivalent to an equidistant course of the orifice to the aforementioned axis of symmetry and/or axis of rotation. Each point of the orifice of a radially-aligned recess thus has the same distance from the axis of symmetry and/or axis of rotation.

The recesses are preferably developed as continuous holes. A continuous recess is distinguished by two orifices which are connected by the recess and between which the recess thus extends.

In a further preferred development, the wall strength of the bell housing is uniform or constant. This means that the strength or thickness of the wall in cross-section has the same value at all points. This improves manufacturability by casting.

The recesses are preferably diamond-shaped.

In a particularly preferred development, the bell housing is part of a gear mechanism with at least one planetary stage. In addition to at least two planet gears, the planetary stage has a sun gear, a ring gear, and a planet carrier, in which the planet gears are rotatably mounted. Each of the planet gears meshes with the sun gear and/or the ring gear.

The number of recesses in the bell housing is not integer divisible by the number of planet gears. This improves the oscillation behavior of the gear mechanism.

In a preferred development, the gear mechanism has a drive shaft extending through the bell housing. This means, conversely, that the bell housing surrounds the drive shaft.

The drive shaft is preferably connected in a torque-proof manner to the sun gear, the ring gear, or the planet carrier of the planetary stage.

Figure 1B:
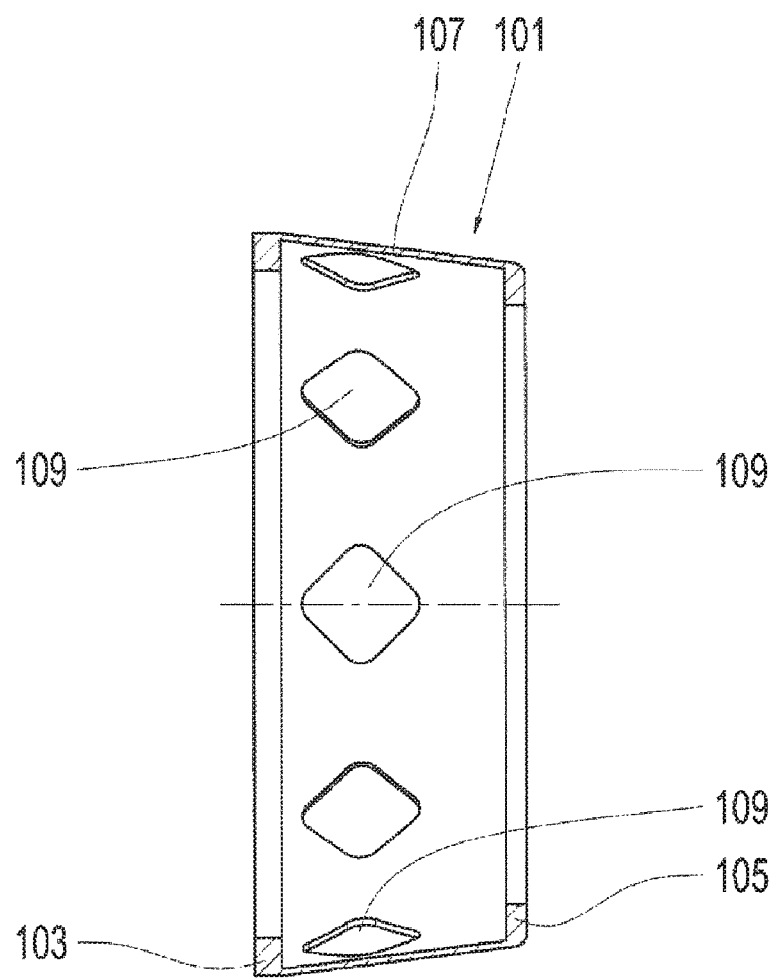

The bell housing 101 shown in FIGS. 1a and 1b is provided with an annular first flange 103 and an also annular second flange 105. The two flanges 103, 105 are connected to one another by a wall 107. Diamond-shaped recesses 109 are introduced into the wall 107.

Figure 2:
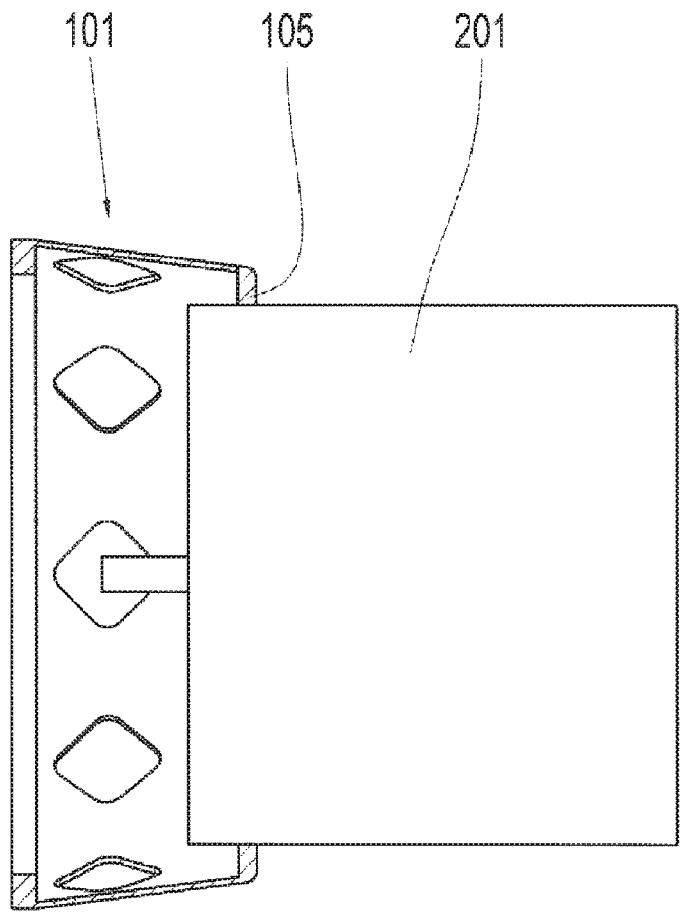
FIG. 2 illustrates a gear mechanism with a bell housing.

As shown in FIG. 2, the second flange 105 can be screwed to a housing of a gear mechanism 201.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS

101 Bell housing
103 First flange
105 Second flange
107 Wall
109 Recess

The invention claimed is:

1. A gear assembly for a wind turbine, comprising:
a gear mechanism, comprising at least one planetary stage with planet gears; and
a bell housing, comprising:
a first region configured to be secured in a nacelle of a wind turbine,
a second region configured to receive the gear mechanism, and
a wall connecting the first region and the second region together, wherein the wall is provided with at least two recesses,
wherein a number of the at least two recesses of the bell housing is not integer divisible by a number of the planet gears.

2. The gear assembly according to claim 1, wherein the bell housing has a rotationally symmetrical basic shape.

3. The gear assembly according to claim 1, wherein the recesses are arranged such that at least one cross-sectional plane intersects the recesses.

4. The gear assembly according to claim 1, wherein each of the two recesses can be mapped onto each other by rotation.

5. The gear assembly according to claim 1, wherein the recesses are radially aligned.

6. The gear assembly according to claim 1, wherein the recesses are continuous.

7. The gear assembly according to claim 1, wherein the wall has a uniform strength.

8. The gear assembly according to claim 1, wherein the recesses are diamond-shaped.

9. The gear assembly according to claim 1, further comprising a drive shaft, wherein the drive shaft extends through the bell housing.

10. The gear assembly according to claim 9, wherein the drive shaft is connected in a torque-proof manner to a sun gear, ring gear, or planet carrier of the at least one planetary stage.

11. The gear assembly according to claim 1, wherein the bell housing includes a flange, and wherein the flange of the bell housing is screwed to a housing of the gear mechanism.

* * * * *